: US 8,222,999 B2
(45) Date of Patent: Jul. 17, 2012

(12) United States Patent
Hiramatsu et al.

(54) COMMODITY DISPLAY POSITION ALERT SYSTEM AND COMMODITY DISPLAY POSITION ALERT METHOD

(75) Inventors: Kenya Hiramatsu, Tokyo (JP); Akio Hiruma, Tokyo (JP); Kenji Shimizu, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 270 days.

(21) Appl. No.: 12/640,660

(22) Filed: Dec. 17, 2009

(65) Prior Publication Data

US 2010/0156602 A1 Jun. 24, 2010

(30) Foreign Application Priority Data

Dec. 22, 2008 (JP) ................................ 2008-325889

(51) Int. Cl.
*H04Q 5/22* (2006.01)

(52) U.S. Cl. ..................... 340/10.1; 340/10.2; 340/10.3; 340/10.31; 340/10.32; 340/10.33; 340/10.34; 340/10.4; 340/10.41; 340/10.42; 340/10.5; 340/10.51; 340/10.6; 340/572.1; 340/572.2; 340/572.3; 340/572.4; 340/572.5; 340/572.6; 340/572.7; 340/572.8; 340/572.9; 235/375; 235/376; 235/377; 235/378; 235/379; 235/380; 235/381; 235/382; 235/382.5; 235/383; 235/384; 235/385

(58) Field of Classification Search ........ 340/10.1–10.6, 340/572.1–572.9; 235/375–385
See application file for complete search history.

(56) References Cited

U.S. PATENT DOCUMENTS

| 4,443,692 | A * | 4/1984 | Nishimura .................... 235/379 |
| 5,748,908 | A * | 5/1998 | Yu .................................... 705/44 |
| 6,055,438 | A * | 4/2000 | Winner, Jr. .................... 455/521 |
| 6,487,542 | B2 * | 11/2002 | Ebata et al. ..................... 705/69 |
| 6,491,216 | B1 * | 12/2002 | May .............................. 235/375 |
| 6,498,603 | B1 * | 12/2002 | Wallace ........................ 345/177 |
| 6,526,273 | B1 * | 2/2003 | Link et al. ..................... 455/406 |
| 7,004,385 | B1 * | 2/2006 | Douglass ..................... 235/379 |

(Continued)

FOREIGN PATENT DOCUMENTS

JP 2005-352725 12/2005

(Continued)

OTHER PUBLICATIONS

Japanese Office Action Mailed Oct. 19, 2010 for Japanese Patent Application No. 2008-325889.

*Primary Examiner* — George Bugg
*Assistant Examiner* — Paul Obiniyi
(74) *Attorney, Agent, or Firm* — Turocy & Watson, LLP (57) ABSTRACT

A commodity display position alert system includes commodity display shelves set in a selling floor space of a store, an RFID reader provided in each of the commodity display shelves, and a server as a system control unit. The RFID reader reads a commodity code from an RFID tag attached to a commodity. A server compares the commodity code of the commodity and display permission information stored in a database functioning as a shelf-rule storing unit and determines whether the read commodity code is a commodity code of a commodity that should be displayed on the commodity display shelf. When the server determines that a commodity other than the commodity that should be displayed on the commodity display shelf is displayed on the commodity display shelf, the server performs control for outputting a reporting signal for causing the PDA terminal to perform reporting operation.

10 Claims, 10 Drawing Sheets

U.S. PATENT DOCUMENTS

| | | | | |
|---|---|---|---|---|
| 7,201,313 | B1* | 4/2007 | Ramachandran | 235/379 |
| 7,216,800 | B1* | 5/2007 | Ramachandran | 235/379 |
| 7,284,692 | B1* | 10/2007 | Douglass | 235/379 |
| 7,350,230 | B2* | 3/2008 | Forrest | 726/9 |
| 7,461,780 | B2* | 12/2008 | Potts et al. | 235/380 |
| 7,577,612 | B2* | 8/2009 | Waller et al. | 705/43 |
| 2001/0051922 | A1* | 12/2001 | Waller et al. | 705/43 |
| 2002/0052193 | A1* | 5/2002 | Chetty | 455/412 |
| 2002/0091937 | A1* | 7/2002 | Ortiz | 713/200 |
| 2002/0095588 | A1* | 7/2002 | Shigematsu et al. | 713/186 |
| 2002/0138424 | A1* | 9/2002 | Coyle | 705/39 |
| 2002/0195309 | A1* | 12/2002 | Pope | 194/217 |
| 2003/0083936 | A1* | 5/2003 | Mueller et al. | 705/14 |
| 2003/0163710 | A1* | 8/2003 | Ortiz et al. | 713/186 |
| 2003/0177102 | A1* | 9/2003 | Robinson | 705/75 |
| 2003/0213843 | A1* | 11/2003 | Jackson | 235/382 |
| 2004/0016796 | A1* | 1/2004 | Hanna et al. | 235/375 |
| 2004/0124966 | A1* | 7/2004 | Forrest | 340/5.8 |
| 2006/0131395 | A1* | 6/2006 | Potts et al. | 235/380 |
| 2006/0247973 | A1* | 11/2006 | Mueller et al. | 705/14 |
| 2006/0271441 | A1* | 11/2006 | Mueller et al. | 705/14 |
| 2006/0288233 | A1* | 12/2006 | Kozlay | 713/186 |
| 2007/0226142 | A1* | 9/2007 | Hanna et al. | 705/41 |
| 2008/0005578 | A1* | 1/2008 | Shafir | 713/186 |
| 2008/0120237 | A1* | 5/2008 | Lin | 705/44 |
| 2008/0155269 | A1* | 6/2008 | Yoshikawa | 713/186 |
| 2008/0265019 | A1* | 10/2008 | Artino et al. | 235/379 |
| 2009/0065573 | A1* | 3/2009 | Potts et al. | 235/379 |
| 2009/0107800 | A1* | 4/2009 | Nishida et al. | 194/302 |
| 2009/0114716 | A1* | 5/2009 | Ramachandran | 235/379 |
| 2010/0052844 | A1* | 3/2010 | Wesby | 340/5.7 |
| 2010/0274723 | A1* | 10/2010 | Joao | 705/44 |

FOREIGN PATENT DOCUMENTS

JP    2007-206745    8/2007

* cited by examiner

143 SHELF MASTER

| SHELF CODE (143a) | SHELF CODE (143b) |
|---|---|
| A | 0 |
| B | 1 |
| C | 2 |
| D | 1 |
| E | 1 |
| F | 0 |
| G | 0 |
| H | 2 |

FIG.4B

144 SHELF DETAIL MASTER

| SHELF CODE (144a) | DISPLAY PERMISSION INFORMATION (144b) | NOTIFICATION RANK (144c) |
|---|---|---|
| A | CATEGORY γ | LEVEL 1 |
| B | CATEGORY α, CATEGORY β | LEVEL 1 |
| H | CODE M1 | LEVEL 2 |

FIG.4C

145 SHELF STATE TABLE

| SHELF CODE (145a) | COMMODITY CODE (145b) |
|---|---|
| A | CODE M5, CODE M6 |
| B | CODE M2, CODE M3, CODE M4 |
| H | CODE M1 |

FIG.4D

146 COMMODITY MASTER

| COMMODITY CODE (146a) | CATEGORY CODE (146b) |
|---|---|
| CODE M1 | CATEGORY α (TOPS) |
| CODE M2 | CATEGORY β (COATS) |
| CODE M3 | CATEGORY γ (BOTTOMS) |
| CODE M4 | CATEGORY β (COATS) |
| CODE M5 | CATEGORY γ (BOTTOMS) |
| CODE M6 | CATEGORY γ (BOTTOMS) |

FIG.4E

147 NOTIFICATION RULE TABLE

| REPORTING TERMINAL CODE (147a) | NOTIFICATION RANK (147b) |
|---|---|
| 0001 | LEVEL 1 |
| 0002 | LEVEL 1, LEVEL 2 |
| 0003 | LEVEL 1, LEVEL 2 |
| 0004 | LEVEL 2 |

FIG.6

(FROM FIG. 5)

↓

DETERMINE, WITH REFERENCE TO SHELF DETAIL MASTER, PLURAL CATEGORIES OF COMMODITIES THAT SHOULD BE DISPLAYED ~ACT 201

↓

GRASP, WITH REFERENCE TO SHELF STATE TABLE, COMMODITY CODES OF DISPLAYED COMMODITIES ~ACT 202

(FROM FIG. 5)

↓

DETERMINE, WITH REFERENCE TO SHELF DETAIL MASTER, COMMODITY CODE OF COMMODITY THAT SHOULD BE DISPLAYED ~ACT 301

↓

GRASP, WITH REFERENCE TO SHELF STATE TABLE, COMMODITY CODE OF DISPLAYED COMMODITY ~ACT 302

COMMODITY DISPLAY POSITION ALERT SYSTEM AND COMMODITY DISPLAY POSITION ALERT METHOD

CROSS-REFERENCE TO RELATED APPLICATION

This application claims the benefit of priority from Japanese Patent Application No. 2008-325889 filed on Dec. 22, 2008, the entire content of which is incorporated herein by reference.

TECHNICAL FIELD

The present invention relates to a commodity display position alert system and a commodity display position alert method for realizing efficiency of organizing work for commodities performed by a store clerk.

BACKGROUND

A retail store desirably sells various commodities with the commodities displayed in a place where the commodities should be displayed. For example, underwear should not be mixed in a shelf where T-shirts should be displayed. However, some customer leaves a commodity, which the customer picks up to purchase, in a place where the commodity should not originally be displayed feeling it troublesome to return the commodity to its original place.

As an example of a technique for preventing a commodity from being left, JP-A-2005-352725 discloses a commodity movement identifying apparatus. The commodity movement identifying apparatus includes an RFID reader arranged in a commodity display shelf, an RFID reader attached to a shopping basket, and a notifying unit attached to the shopping basket. The RFID readers have a radio communication function. A customer carries the shopping basket during shopping. In the commodity movement identifying apparatus, the RFID readers read an identification code peculiar to each of commodities from an RFID tag attached to the commodity, whereby the commodity movement identifying apparatus grasps the present position of the commodity. When the customer is about to return a commodity to a place other than a place to which the commodity should originally be returned, the notifying unit urges the customer to return the commodity to the place to which the commodity should originally be returned. JP-A-2005-352725 also discloses that the commodity movement identifying apparatus causes a commodity-position-abnormality display unit to display position abnormality of a commodity in order to notify an administrator of a store of the position abnormality of the commodity when a customer returns the commodity to a wrong place. The commodity-position-abnormality display unit is connected to a communication network included in a store.

In the technique disclosed in JP-A-2005-352725, the notifying unit is attached to the shopping basket to urge a customer to return a commodity to its original position. However, when the customer is urged to take an action to return the commodity to its original position, a part of a purchasing action of the customer is limited. The limitation on the purchasing action prevents a purchasing behavior of the customer and deprives the customer of an opportunity of commodity purchase. Some customer holds a commodity, which the customer plans to purchase, by hand without carrying a shopping basket. The technique disclosed in JP-A-2005-352725 cannot urge the customer not carrying a shopping basket to return the commodity to its original position. In the technique disclosed in JP-A-2005-352725, RFID readers having the radio communication function and notifying units are attached to all shopping baskets prepared in the store. Therefore, initial cost in introducing this technique into the store is enormous.

SUMMARY

It is an object of the present invention to easily realize efficiency of organizing work for commodities performed by a store clerk.

According to an aspect of the present invention, there is provided a commodity display position alert system including: commodity display shelves; an RFID reader provided in each of the commodity display shelves and configured to read a commodity attribute of a commodity from an RFID tag that is attached to the commodity displayed on the commodity display shelf and stores the commodity attribute of the commodity; a signal output unit configured to output a signal to a reporting terminal; and a system control unit configured to refer to a shelf-rule storing unit that stores, in association with a shelf code for specifying the commodity display shelf, display permission information for defining a commodity that should be displayed on the commodity display shelf, compare the commodity attribute read by the RFID reader and the display permission information corresponding to the shelf code of the commodity display shelf to which the RFID reader is attached, and, when it is determined that a commodity other than the commodity that should be displayed on the commodity display shelf is displayed on the commodity display shelf, cause the signal output unit to output a reporting signal for causing the reporting terminal to perform reporting operation.

According to another aspect of the present invention, there is provided a commodity display position alert method including: an RFID reader provided in each of the commodity display shelves reading a commodity attribute of a commodity from an RFID tag that is attached to the commodity displayed on the commodity display shelf and stores the commodity attribute of the commodity; and a system control unit referring to a shelf-rule storing unit that stores, in association with a shelf code for specifying the commodity display shelf, display permission information for defining a commodity that should be displayed on the commodity display shelf, comparing the commodity attribute read by the RFID reader and the display permission information corresponding to the shelf code of the commodity display shelf to which the RFID reader is attached, and, when it is determined that a commodity other than the commodity that should be displayed on the commodity display shelf is displayed on the commodity display shelf, causing a signal output unit to output a reporting signal for causing a reporting terminal to perform reporting operation.

DETAILED DESCRIPTION

A first embodiment of the present invention is explained below with reference to FIG. 1 to FIGS. 8A to 8C.

Figure 1:
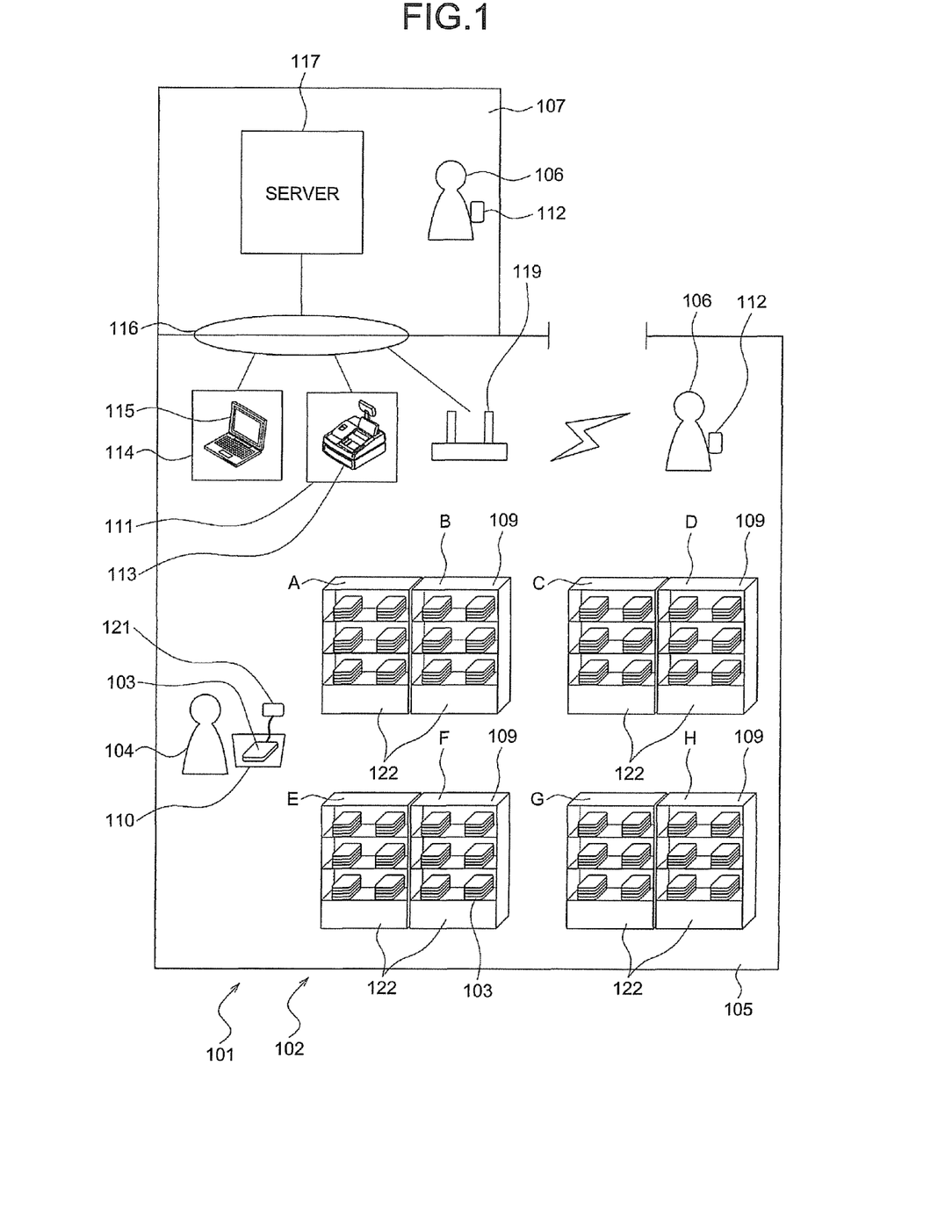
FIG. 1 is a schematic diagram of an entire commodity display position alert system according to a first embodiment of the present invention.

FIG. 1 is a schematic diagram of an entire commodity display position alert system 101. The commodity display position alert system 101 is installed in, for example, a supermarket 102. The supermarket 102 is sectioned into a selling floor space 105 and a backyard 107. The selling floor space 105 is a space where commodities 103 are displayed and a customer 104 purchases the commodities 103. The backyard 107 is a space where only a store clerk 106 is allowed to enter.

In the selling floor space 105, eight commodity display shelves 109 are set. The commodity display shelves 109 are explained below with reference signs A to H affixed thereto as appropriate as shown in FIG. 1. Clothes are displayed on the commodity display shelves A to D. Foods are displayed on the commodity display shelves E to G. The commodity display shelf H has a place specially prepared for selling only specific commodities 103. The customer 104 walks around the selling floor space 105 carrying a shopping basket 110, puts the commodity 103 that the customer 104 is about to purchase in the shopping basket 110, carries the commodity 103 to a register area 111, and pays for the commodity 103 in the register area 111. The shopping basket 110 is prepared by the supermarket 102 in advance. The customer 104 may directly carry the commodity 103 by hand without using the shopping basket 110 and walk to the register area 111 to pay for the commodity 103. On the other hand, the store clerk 106 guides the customer 104 and performs commodity display work in the selling floor space 105. The store clerk 106 performs stock check work in the backyard 107. The store clerk 106 operates a POS terminal 113 and performs checkout for the commodity 103 purchased by the customer 104. The POS terminal 113 is set in the register area 111 of the selling floor space 105. The store clerk 106 operates a guide terminal 115 and guides the customer 104. The guide terminal 115 is set on a service counter 114 in the selling floor space 105. Both of the POS terminal 113 and the guide terminal 115 are connected to a LAN 116 disposed in the supermarket 102. A server 117 as a system control unit is connected to the LAN 116. The server 117 is set in the backyard 107. A radio access point 119 is connected to the LAN 116. As an example, the radio access point 119 is set on the ceiling (not shown) of the selling floor space 105. The radio access point 119 performs radio communication with a PDA terminal 112 functioning as a reporting terminal. The store clerk 106 carries the PDA terminal 112 during a job. The radio access point 119 configures a signal output unit for the server 117 to transmit and receive radio signals.

RFID tags 121 are attached to all commodities 103 displayed on the commodity display shelves 109. Each of the RFID tags 121 stores therein a commodity attribute concerning each of the commodities 103. As the commodity attribute, for example, in the case of commodities, types of which are clearly different for each of model numbers, such as stationary goods, a commodity code for specifying each of the commodities can be adopted. As another example, in the case of commodities, types of which cannot be clearly classified, such as an assorted food pack, a category code indicating a category of each of commodities can be adopted. As the commodity attribute, any commodity attribute can be adopted as long as the commodity attribute plays a role of identifying a characteristic of a commodity. The commodity attribute is not limited to the commodity code and the category code. In the following explanation, it is assumed that the RFID tag 121 stores therein the commodity code.

Figure 2:
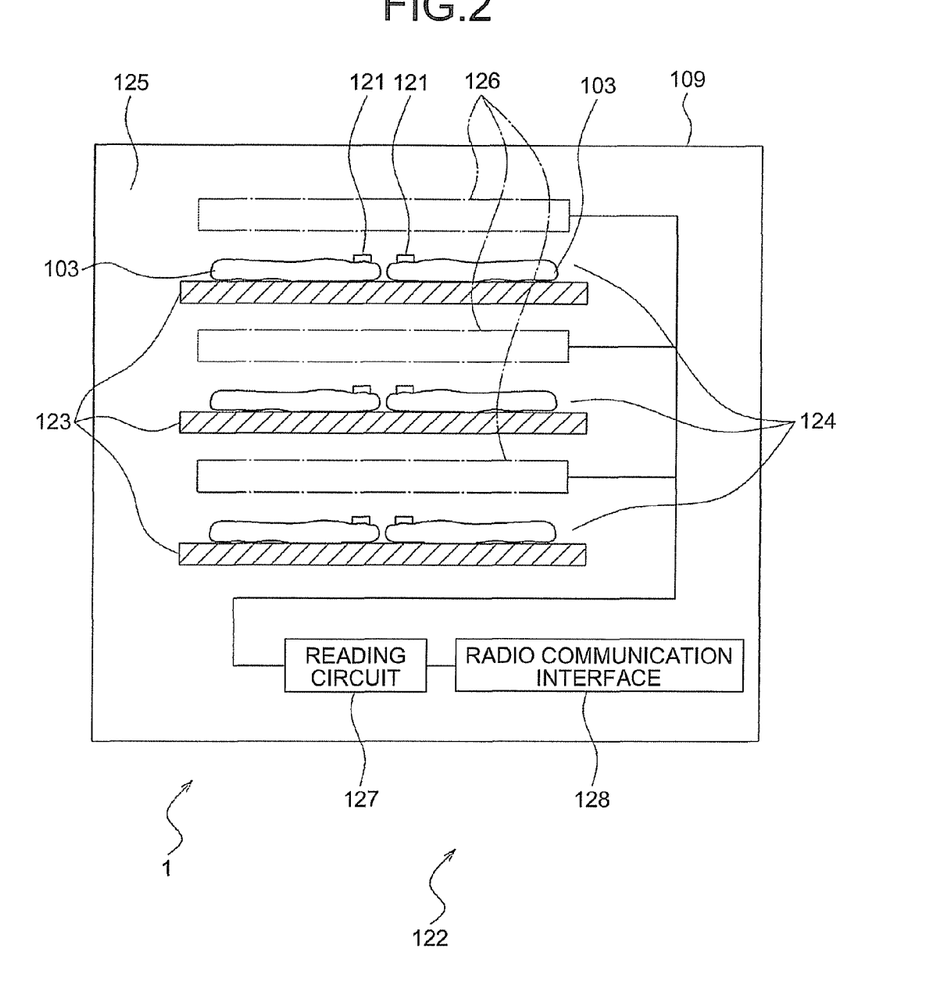
FIG. 2 is a schematic front view of a commodity display shelf.

FIG. 2 is a schematic front view of the commodity display shelf 109. The commodity display shelf 109 includes three shelf plates 123 having a radio wave absorbing function and three commodity storage spaces 124 partitioned by the shelf plates 123. Antennas 126 are arranged in the respective commodity storage spaces 124. The antennas 126 are attached to a back plate 125 of the commodity display shelf 109. The antennas 126 perform near-distance radio communication with the RFID tags 121. Since the antennas 126 are provided to cover the full distance in the width direction of the commodity storage spaces 124, no matter where the RFID tags 121 are placed in the commodity storage spaces 124, the antennas 126 can perform the near-distance radio communication with the RFID tags 121. The antennas 126 are connected to a reading circuit 127. The reading circuit 127 is located in a lower part of the commodity display shelf 109. The reading circuit 127 is connected to a radio communication interface 128. The radio communication interface 128 transmits a radio signal to the radio access point 119 (see FIG. 1). The reading circuit 127 reads, via the antennas 126, commodity codes stored in the RFID tags 121 attached to the commodities 103 and causes the radio communication interface 128 to transmit the commodity codes as a radio signal. In other words, the antennas 126 and the reading circuit 127 configure an RFID reader 122.

Figure 3:
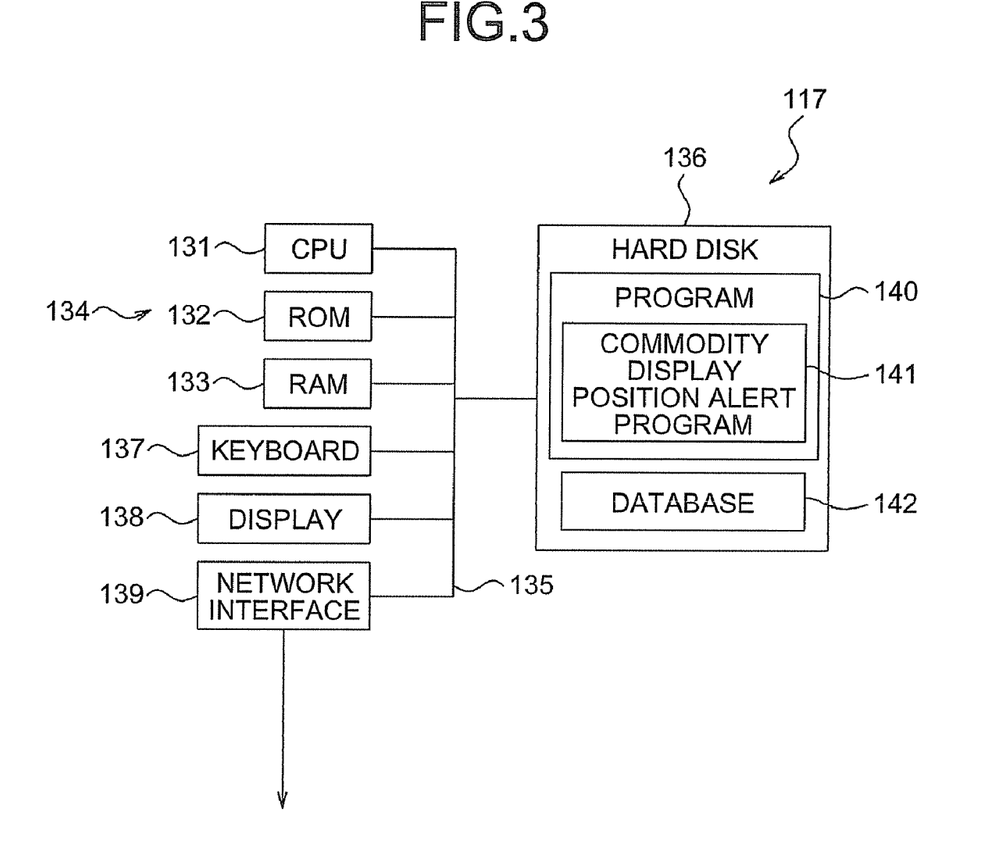
FIG. 3 is a block diagram of the electric configuration of a server.

FIG. 3 is a block diagram of the electric configuration of the server 117. The server 117 includes an information processing unit 134. The information processing unit 134 includes a CPU 131, a ROM 132, and a RAM 133. The information processing unit 134 is connected to a hard disk 136, a keyboard 137, a display 138, and a network interface 139 via a bus line 135. The network interface 139 realizes data communication between the server 117 and other apparatuses connected to the LAN 116.

The hard disk 136 stores therein a computer program 140 for causing the CPU 131 to realize various kinds of information processing and a database 142 (explained later with reference to FIGS. 4A to 4E). The computer program 140 includes a commodity display position alert program 141. The commodity display position alert program 141 causes the CPU 131 to realize processing shown in FIGS. 5 to 7. Besides, the computer program 140 includes an OS and a driver program. The CPU 131 copies the entire computer program 140 or a part of the computer program 140 during the start of the server 117 and executes processing corresponding to content described in the computer program 140.

FIGS. 4A to 4E are schematic diagrams of the structure of the database 142. The database 142 includes a shelf master 143, a shelf detail master 144, a shelf state table 145, a commodity master 146, and a notification rule table 147. The database 142 functions as a shelf-rule storing unit.

Figure 4A:
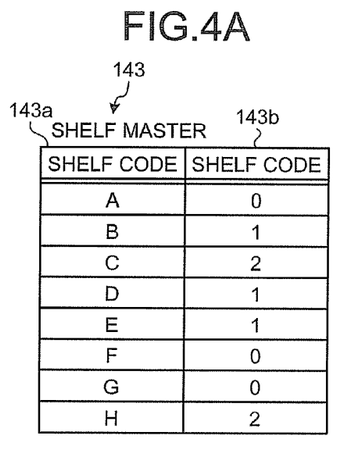
FIGS. 4A to 4E are diagrams of the structure of a database.

The shelf master 143 defines a shelf mode 143b in association with a shelf code 143a. The shelf mode 143b indicates a degree of diversity of the commodities 103 that should be displayed on the commodity display shelves 109. The shelf code 143a specifies the commodity display shelf 109. Specifically, when only the commodities 103 of a predetermined one kind of category are displayed on the commodity display shelf 109, the shelf mode 143b corresponding to the shelf code 143a of the commodity display shelf 109 is "0". When the commodities 103 of predetermined plural categories are displayed on the commodity display shelf 109, the shelf mode 143b corresponding to the shelf code 143a of the commodity display shelf 109 is "1". When the commodities 103 of a predetermined kind are displayed on the commodity display shelf 109, the shelf mode 143b corresponding to the shelf code 143a of the commodity display shelf 109 is "2".

Figure 4B:
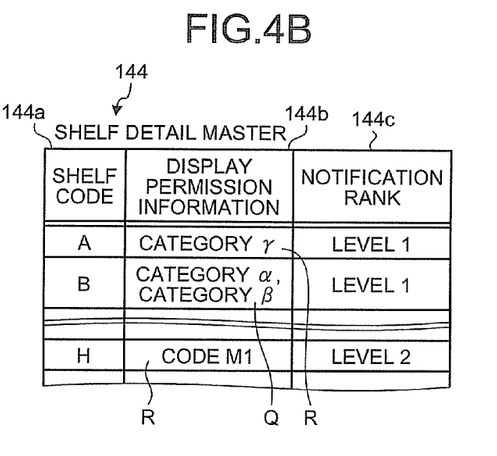

The shelf detail master 144 stores therein a shelf code 144a and display permission information 144b for defining the commodities 103, which should be displayed on the commodity display shelf 109, in association with each other. The shelf detail master 144 is the core of the shelf-rule storing unit. As shown in FIG. 4B, the shelf detail master 144 stores therein "category γ" as the display permission information 144b in association with the shelf code 144a "A". The category γ indicates bottoms. Specifically, the shelf detail master 144 indicates that only the commodities 103 belonging to the category γ should be placed on the commodity display shelf A specified by the shelf code 144a. As shown in FIG. 4B, the shelf detail master 144 stores therein "category α and category β" as the display permission information 144b in association with the shelf code 144a "B". The category α indicates tops and the category β indicates bottoms. Specifically, the shelf detail master 144 indicates that the commodities 103 belonging to the category α or the category β should be placed on the commodity display shelf B specified by the shelf code 144a. As shown in FIG. 4B, the shelf detail master 144 stores therein "code M1" as the display permission information 144b in association with the shelf code 144a "C". Specifically, the shelf detail master 144 indicates that only the commodities 103 specified by the commodity code named code M1 should be displayed on the commodity display shelf C specified by the shelf code 144a. The shelf detail master 144 also stores therein a notification rank 144c in association with the shelf code 144a. The notification rank 144c indicates a difference in a type of a reporting signal transmitted to the PDA terminal 112 when a commodity other than a commodity that should be placed on the commodity display shelf 109 according to the display permission information 144b is placed on the commodity display shelf 109. "Level 1" is set as the notification rank 144c for the commodity display shelf 109 in which mixing of commodities of other types is undesirable. "Level 2" is set as the notification rank 144c for the commodity display shelf 109 in which mixing of commodities of other types is desirably prevented. As an example, "level 2" is set as the notification rank 144c to correspond to the shelf code 144a of the commodity display shelf 109 that is a specially-prepared place where only commodities of one type should be displayed. In this way, the notification rank 144c is set according to a type of the commodities 103 that should be displayed on the commodity display shelf 109.

Figure 4C:
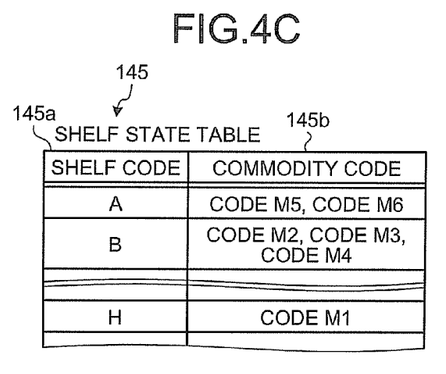

The shelf state table 145 stores therein a shelf code 145a and a commodity code 145b in association with each other.

Figure 4D:
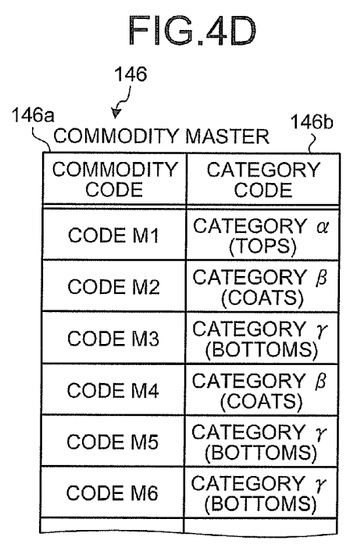

The commodity master 146 defines to which categories the commodities 103 belong. Specifically, the commodity master 146 stores therein a commodity code 146a and a category code 146b in association with each other.

Figure 4E:
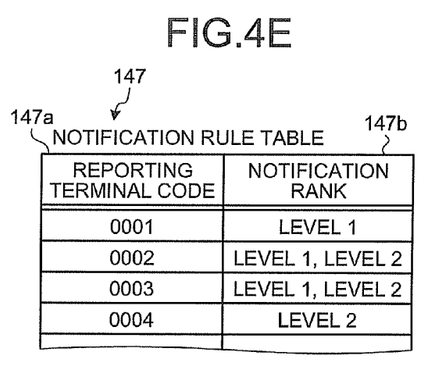

The notification rule table 147 defines which PDA terminal 112 is caused to perform reporting operation when a commodity other than a commodity that should be placed on the commodity display shelf 109 is placed on the commodity display shelf 109. Specifically, the notification rule table 147 stores therein a reporting terminal code 147a for specifying the PDA terminal 112 and a notification rank 147b in association with each other.

The computer program 140 includes an application program (not shown) for editing contents of the shelf master 143, the shelf detail master 144, the shelf state table 145, the commodity master 146, and the notification rule table 147. A user rewrites the content of the database 142 when necessary using the application program. The user starts the application program via the keyboard 137 and the display 138. The server 117 includes the keyboard 137 and the display 138.

In the commodity display position alert system 101, the reading circuit 127 of the RFID reader 122 set in each of the commodity display shelves 109 periodically emits a radio wave and performs near-distance radio communication with the RFID tag 121 located in the commodity display shelf 109. Subsequently, the reading circuit 127 acquires the commodity code stored in the RFID tag 121 and transmits the acquired commodity code from the radio communication interface 128 to the server 117. The server 117 stands by for reception of the commodity code transmitted from the RFID reader 122. When the server 117 determines that the commodity code is received, the server 117 stores the received commodity code in the shelf state table 145 in the database 142 in association with a shelf code for specifying the commodity display shelf 109 to which the RFID reader 122 at the reception source is attached. Therefore, the shelf state table 145 stores commodity codes of all the commodities 103 displayed on the commodity display shelves 109.

Figure 5:
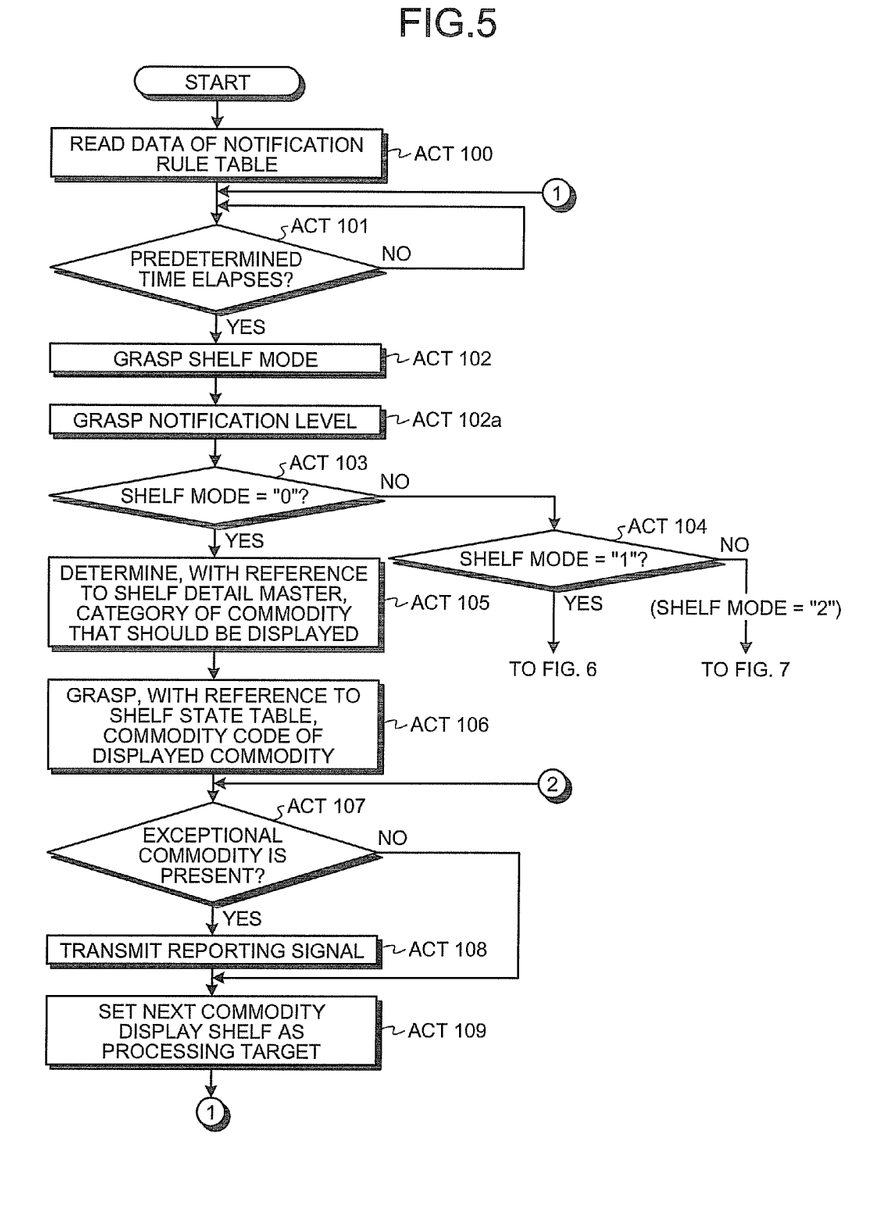
FIG. 5 is a flowchart for explaining a part of a flow of commodity display position alert processing.

FIG. 5 is a flowchart for explaining a part of a flow of commodity display position alert processing. The CPU 131 of the server 117 executes the commodity display position alert program 141 and starts the commodity display position alert processing. According to the commodity display position alert program 141, the CPU 131 stores, with reference to the notification rule table 147, the reporting terminal code 147a and the notification rank 147b corresponding thereto in the RAM 133 (Act 100).

Subsequently, the CPU 131 stays on standby during standby time set in advance (Act 101). The CPU 131 grasps, with reference to the shelf master 143, the shelf mode 143b set in one commodity display shelf 109, which is a processing target (Act 102). The user can set the standby time in Act 101 to desired time (e.g., three minutes) via the keyboard 137 and the display 138 according to processing by the computer program 140 stored in the hard disk 136 of the server 117.

In the following explanation, it is assumed that the commodity display shelf A is the processing target commodity display shelf 109.

The CPU 131 acquires, with reference to the shelf detail master 144, the notification rank 144c corresponding to a shelf code of the processing target commodity display shelf 109 (Act 102a).

The CPU 131 divides the processing according to whether the shelf mode 143b grasped in Act 102 is "0", "1", or "2" (Act 103 and Act 104). Processing performed when the shelf mode 143b is "1" or "2" is explained later with reference to FIGS. 6 and 7. If the CPU 131 determines that the shelf mode 143b is "0" (Y in Act 103), the CPU 131 acquires, with reference to the shelf detail master 144, the shelf permission information 144b corresponding to the shelf code of the processing target commodity display shelf 109 and determines one category of the commodities 103 that should be displayed on the commodity display shelf 109 (Act 105).

In Act 105, the CPU 131 adopts, with reference to the shelf detail master 144, a category set in the display permission information 144b corresponding to the shelf code of the processing target commodity display shelf 109 as the category of the commodities 103 that should be displayed on the commodity display shelf 109 (see reference sign P in FIG. 4B). Concerning the commodity display shelf 109, the shelf mode 143b of which is set to "0" in the shelf master 143, it is desirable that a single category is set in the display permission information 144b of the shelf detail master 144. In Act 105, when data stored as the display permission information 144b of the shelf detail master 144 indicates two or more categories, the CPU 131 adopts a category stored at the top as the category of the commodities 103 that should be displayed on the commodity display shelf 109 (see reference sign Q in FIG. 4B). In Act 105, when the data stored as the display permission information 144b of the shelf detail master 144 is commodity codes, the CPU 131 determines, with reference to the commodity master 146, a category to which a commodity code stored at the top belongs and adopts the category as the category of the commodities 103 that should be displayed on the commodity display shelf 109 (see reference sign R in FIG. 4B).

The CPU 131 acquires, with reference to the shelf state table 145, the commodity code 145b corresponding to the shelf code of the processing target commodity display shelf 109 and grasps commodity codes of all the commodities 103 displayed on the processing target commodity display shelf 109 (Act 106).

The CPU 131 determines whether the commodity 103 (an exceptional commodity) that should not be displayed on the processing target commodity display shelf 109 is present on the commodity display shelf 109 (Act 107). In Act 107, the CPU 131 grasps, with reference to the commodity master 146, the category codes 146b corresponding to all the commodity codes grasped in Act 106. When the category code 146 not coinciding with the category determined in Act 105 is included in the grasped category codes 146b, the CPU 131 determines that an exceptional commodity is present. Only if the CPU 131 determines that the exceptional commodity is present (Y in Act 107), the CPU 131 proceeds to Act 108. In Act 108, the CPU 131 extracts the reporting terminal code 147a matching the notification rank 144c acquired in Act 102a among the data of the notification rule table 147 stored in the RAM 133 in Act 100. The CPU 131 performs control for causing the radio access point 119 to transmit a reporting signal for causing the PDA terminal 112 specified by the extracted reporting terminal code 147a to perform reporting operation. The reporting signal includes a shelf code and a notification rank of the commodity display shelf 109 on which the exceptional commodity is displayed. Content of the notification rank and the operation of the PDA terminal 112 performed when the reporting signal is received are explained later with reference to FIGS. 8A to 8C.

After Act 108 or if the CPU 131 determines in Act 107 that an exceptional commodity is not present (N in Act 107), the CPU 131 shifts the processing target commodity display shelf 109 to the next commodity display shelf 109 (Act 109) and returns to Act 101. In Act 109, when the commodity display shelf 109 set as the processing target this time is the commodity display shelf A, the CPU 131 sets the commodity display shelf B as the next processing target. When the commodity display shelf 109 set as the processing target this time is the commodity display shelf B, the CPU 131 sets the commodity display shelf C as the next processing target. When the commodity display shelf 109 set as the processing target this time is the commodity display shelf H, the CPU 131 sets the commodity display shelf A as the next processing target. Therefore, as the commodity display position alert processing progresses, the processing target commodity display shelf 109 changes every moment.

Figure 6:
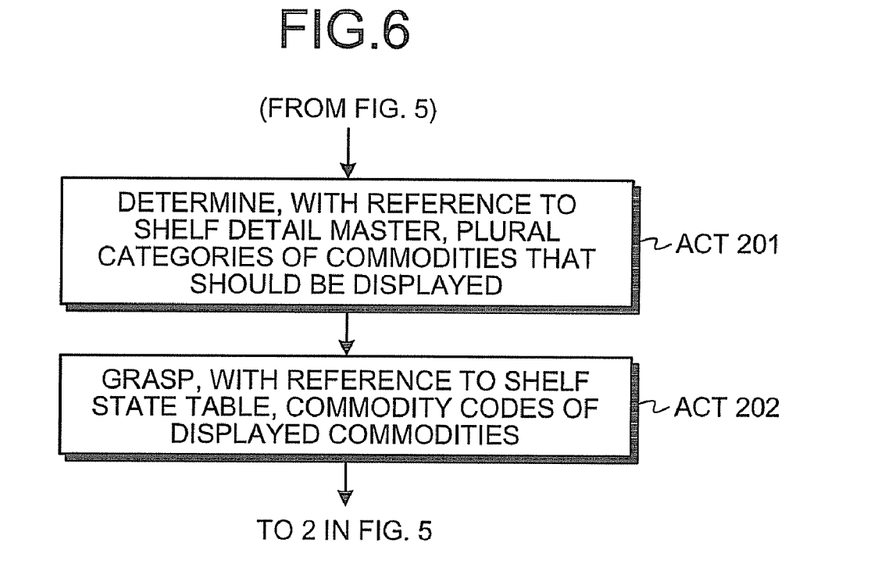
FIG. 6 is a flowchart for explaining another part of the flow of the commodity display position alert processing.

FIG. 6 is a flowchart of another part of the commodity display position alert processing. If the CPU 131 determines that the shelf mode 143b of the processing target commodity display shelf 109 grasped in Act 102 of the commodity display position alert processing (see FIG. 5) is "1" (N in Act 103 and Y in Act 104), the CPU 131 proceeds to Act 201. In Act 201, the CPU 131 acquires, with reference to the shelf detail master 144, the shelf permission information 144b corresponding to the shelf code of the processing target commodity display shelf 109 and determines plural categories of the commodities 103 that should be displayed on the commodity display shelf 109. A difference between Act 105 (see FIG. 5) and Act 201 is the number of categories. Specifically, the shelf mode 143b "0" is a mode for allowing only the commodities 103 belonging to the single category as the commodities 103 that should be displayed on the commodity display shelf 109. On the other hand, the shelf mode 143b "1" is a mode for allowing the commodities 103 belonging to any one of the plural categories as the commodities 103 that should be displayed on the commodity display shelf 109.

In Act 201, the CPU 131 adopts, with reference to the shelf detail master 144, a category set in the display permission information 144b corresponding to the shelf code of the processing target commodity display shelf 109 as the category of the commodities 103 that should be displayed on the commodity display shelf 109 (see reference sign Q in FIG. 4B). Concerning the commodity display shelf 109, the shelf mode 143b of which is set to "1" in the shelf master 143, it is desirable that plural categories are set in the display permission information 144b of the shelf detail master 144. In Act 201, when the data stored as the display permission information 144b of the shelf detail master 144 is data indicating one category, the CPU 131 adopts the one category as the category of the commodities 103 that should be displayed on the commodity display shelf 109 (see reference sign P in FIG. 4B). In Act 201, when the data stored as the display permission information 144b of the shelf detail master 144 is commodity codes, the CPU 131 determines, with reference to the commodity master 146, a category to which the commodity codes belong and adopts the category as the category of the commodities 103 that should be displayed on the commodity display shelf 109 (see reference sign R in FIG. 45).

The CPU 131 acquires, with reference to the shelf state table 145, the commodity code 145b corresponding to the shelf code of the processing target commodity display shelf 109, grasps commodity codes of all the commodities 103 displayed on the processing target commodity display shelf 109 (Act 202), and shifts to Act 107 (see FIG. 5).

Figure 7:
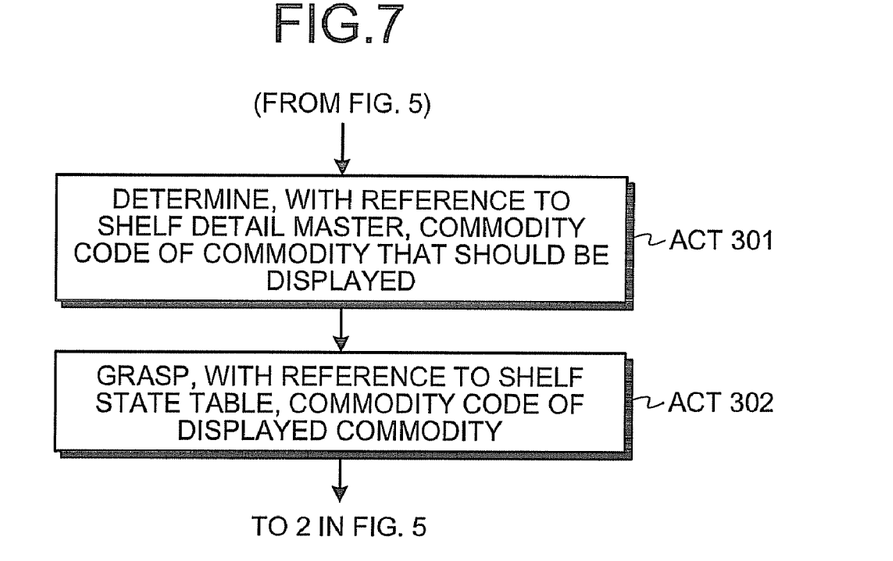
FIG. 7 is a flowchart for explaining a remaining part of the flow of the commodity display position alert processing.

FIG. 7 is a flowchart for explaining a remaining part of the flow of the commodity display position alert processing. If the CPU 131 determines that the shelf mode 143b of the processing target commodity display shelf 109 grasped in Act 102 of the commodity display position alert processing (see FIG. 5) is "2" (N in Act 103 and N in Act 104), the CPU 131 proceeds to Act 301. In Act 301, the CPU 131 acquires, with reference to the shelf detail master 144, the display permission information 144b corresponding to the shelf code of the processing target commodity display shelf 109 and determines a commodity code of the commodities 103 that should be displayed on the commodity display shelf 109. Specifically, the shelf mode 143b "2" is a mode for allowing a commodity matching the commodity code set in the display permission information 144b of the shelf detail master 144 as a commodity that should be displayed on the commodity display shelf 109.

In Act 301, the CPU 131 adopts, with reference to the shelf detail master 144, a commodity code set in the display permission information 144b corresponding to the shelf code of the processing target commodity display shelf 109 as the commodity code of the commodities 103 that should be displayed on the commodity display shelf 109 (see reference sign R in FIG. 4B). Concerning the commodity display shelf 109, the shelf mode 143b of which is set to "2" in the shelf master 143, it is desirable that a commodity code is set in the display permission information 144b of the shelf detail master 144. In Act 301, when the data stored as the display permission information 144b of the shelf detail master 144 is one or two or more categories, the CPU 131 grasps, with reference to the commodity master 146, commodity codes corresponding to the categories and adopts the commodity code as the commodity code of the commodities 103 that should be displayed on the commodity display shelf 109 (see reference signs P and Q in FIG. 4B).

The CPU 131 acquires, with reference to the shelf state table 145, the commodity code 145b corresponding to the shelf code of the processing target commodity display shelf 109 and grasps commodity codes of all the commodities 103 displayed on the processing target commodity display shelf 109 (Act 302). The CPU 131 shifts to processing in Act 107 (see FIG. 5). In determination processing in Act 107, when the CPU 131 determines that a commodity code not coinciding with the commodity code grasped in Act 301 is included in the commodity codes grasped in Act 302, the CPU 131 determines that an exceptional commodity is present.

Figure 8A:
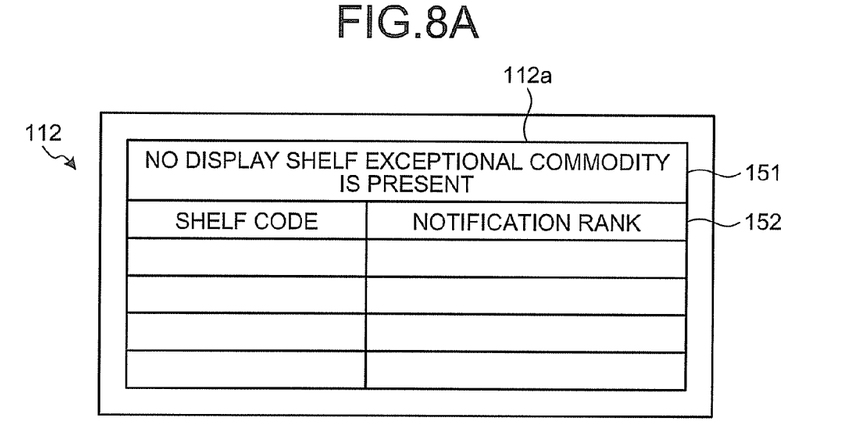
FIGS. 8A to 8C are schematic diagrams of display contents of a PDA terminal.
Figure 8B:
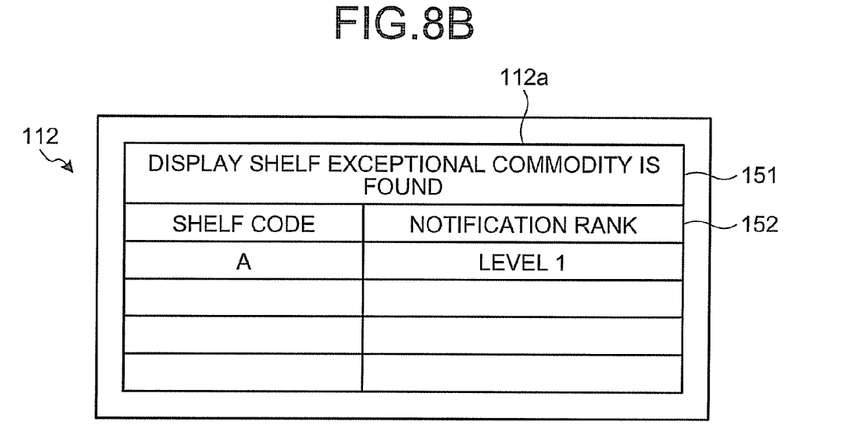
Figure 8C:
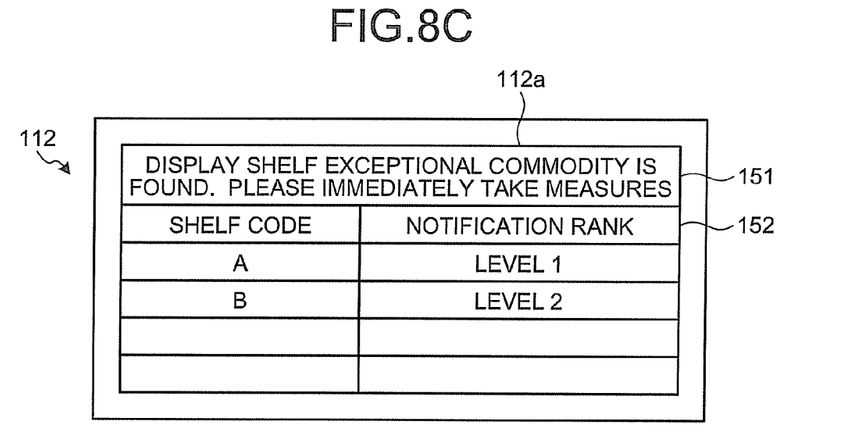

FIGS. 8A to 8C are schematic diagrams of display contents of the PDA terminal 112. The PDA terminal 112 includes a display screen 112a. The PDA terminal 112 receives a radio signal transmitted from the radio access point 119 and displays information based on the received radio signal on the display screen 112a. The PDA terminal 112 is a portable terminal and carried by the store clerk 106. The display screen 112a displays a message display section 151 and an alert section 152 located below the message display section 151. The alert section 152 is an area for displaying a shelf code of the commodity display shelf 109 on which an exceptional commodity is displayed and a notification rank indicating an emergency degree of work for removing the exceptional commodity from the commodity display shelf 109 (also see the notification rank 144c shown in FIG. 4B and the notification rank 147b shown in FIG. 4E). The notification rank includes "level 1" and "level 2". "Level 2" indicates that the emergency degree is high compared with "level 1".

While the PDA terminal 112 does not receive the reporting signal transmitted in Act 108 (see FIG. 5) of the commodity display position alert processing, the PDA terminal 112 displays a message "no display shelf exceptional commodity is present" in the message display section 151 of the display screen 112a (FIG. 8A).

When the PDA terminal 112 receives a reporting signal including information indicating that the notification rank is "level 1", the PDA terminal 112 display a message "a display shelf exceptional commodity is found" in the message display section 151 of the display screen 112a. The PDA terminal 112 displays, in the alert section 152, the shelf code of the commodity display shelf 109 on which the exceptional commodity is displayed and a notification rank corresponding to the commodity display shelf 109 in association with each other (FIG. 8B). The shelf code and the notification rank are included in the reporting signal.

When the PDA terminal 112 receives a reporting signal including information indicating that the notification rank is "level 2", the PDA terminal 112 displays a message "a display shelf exceptional commodity is found. Please immediately take measures" in the message display section 151 of the display screen 112a. Further, the PDA terminal 112 displays, in the alert section 152, the shelf code of the commodity display shelf 109 on which the exceptional commodity is displayed and a notification rank corresponding to the commodity display shelf 109 in association with each other. The shelf code and the notification rank are included in the reporting signal. The PDA terminal 112 sounds a buzzer (not shown) included in the PDA terminal 112 (FIG. 8C).

In the supermarket 102 in which the commodity display position alert system 101 is installed, efficiency of organizing work for commodities by a store clerk is easily realized as explained below.

First, the store clerk operates the keyboard 137 and the display 138 of the server 117, edits the data stored in the database 142, and decides types of the commodities 103 that should be displayed on the commodity display shelves 109 (A to H). As an example, clothes belonging to a category of bottoms are displayed on the commodity display shelf A. Therefore, the store clerk sets the shelf mode 143b corresponding to the shelf code 143a "A" in the shelf master 143 to "0" and stores the category code "category γ" in the display permission information 144b corresponding to the shelf code 144a "A" in the shelf detail master 144. Clothes belonging to a category of tops or coats are displayed on the commodity display shelf B. Therefore, the store clerk sets the shelf mode 143b corresponding to the shelf code 143a "B" in the shelf master 143 to "1" and stores the category codes "category α and category β" in the display permission information 144b corresponding to the shelf code 144a "B" in the shelf detail master 144. The commodity display shelf H has a specially-prepared place for selling only specific commodities 103. In the commodity display shelf H, only the commodities 103 having the commodity code "code M1" are sold. Therefore, the store clerk sets the shelf mode 143b corresponding to the shelf code 143a "H" in the shelf master 143 to "2" and stores one kind of commodity code "code M1" in the display permission information 144b corresponding to the shelf code 144a "H" in the shelf detail master 144.

It is assumed that the customer 104 picks up the commodity 103 from the commodity display shelf 109 for which the conditions explained above are set and returns the commodity 103 to the commodity display shelf 109 on which the commodity 103 should not be displayed. In this case, the RFID reader 122 provided in the commodity display shelf 109, to which the commodity 103 is returned, reads a commodity code of the commodity 103 from the RFID tag 121 attached to the commodity 103. The RFID reader 122 transmits the read commodity code to the server 117. When the server 117 determines that a commodity (an exceptional commodity), which is not the commodity 103 that should be displayed on the commodity display shelf 109, is displayed on the commodity display shelf 109, the server 117 transmits a reporting signal to the PDA terminal 112 carried by the store clerk 106. The store clerk 106 can grasp the commodity display shelf 109 in which the exceptional commodity is mixed looking at display content displayed on the display screen 112a of the PDA terminal 112 in response to the reporting signal. Therefore, the store clerk 106 can immediately perform work for removing the exceptional commodity from the commodity display shelf 109. The PDA terminal 112 performs operation corresponding to each of "level 1" and "level 2" for each of notification ranks. Therefore, the store clerk 106 can determine, in balance with other jobs currently performed, whether it is necessary to urgently perform work for removing the exceptional commodity or the removing work may be performed later. In particular, the commodity display position alert system 101 according to this embodiment can be installed in the supermarket 102 without the RFID reader 122 attached to the shopping basket 110 or the PDA terminal 112 as the reporting terminal carried by the store clerk 106. Therefore, initial cost in installing the commodity display position alert system 101 can be substantially held down. Further, since the commodity display position alert system 101 according to this embodiment urges the store clerk 106 to perform the work for removing the exceptional commodity, the commodity display position alert system 101 does not prevent a purchasing behavior of the customer 104 and does not deprive the customer 104 of an opportunity of commodity purchase.

In Act 101 (see FIG. 5) of the commodity display position alert processing, the commodity display position alert system 101 according to this embodiment advances the processing after staying on standby for the predetermined standby time. Therefore, when the customer 104 arranges the plural commodities 103 on the commodity display shelf 109 in order to determine the commodity 103 that the customer 104 is about to purchase, even if the RFID reader 122 reads a commodity code of an exceptional commodity, which should not be displayed on the commodity display shelf 109, from the RFID tag 121, the PDA terminal 112 does not perform the reporting operation.

A second embodiment of the present invention is explained below with reference to FIG. 9 to FIGS. 11A and 11B.

Components same as those in the first embodiment explained with reference to FIG. 1 to FIGS. 8A to 8C are denoted by the same reference numerals and signs and explanation of the components is omitted. In the commodity display position alert system 101 according to this embodiment, the POS terminal 113 set in the register area 111 is applied as a reporting terminal.

Figure 9:
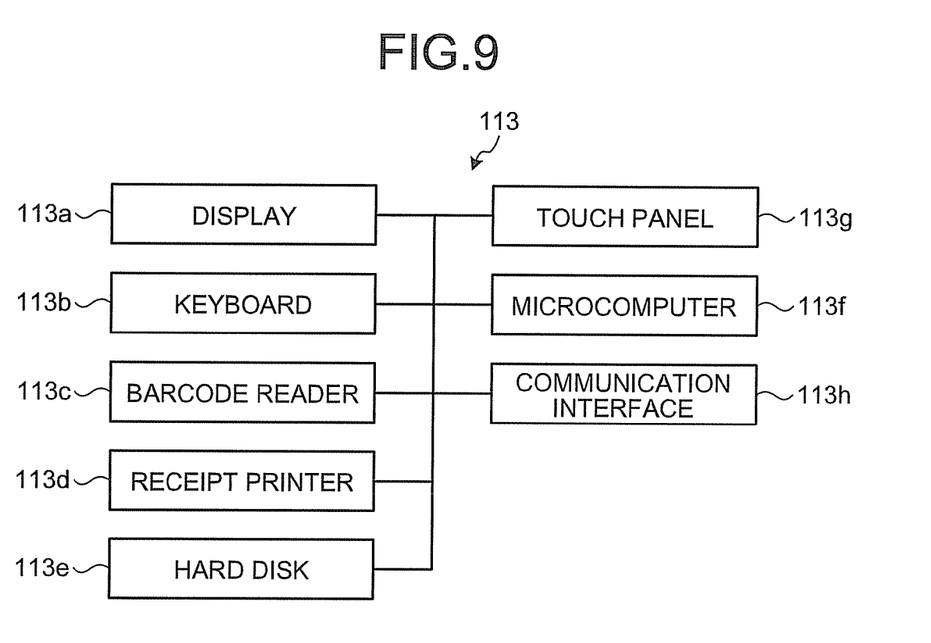
FIG. 9 is a block diagram of the electric configuration of a POS terminal according to a second embodiment of the present invention.
Figure 11A:
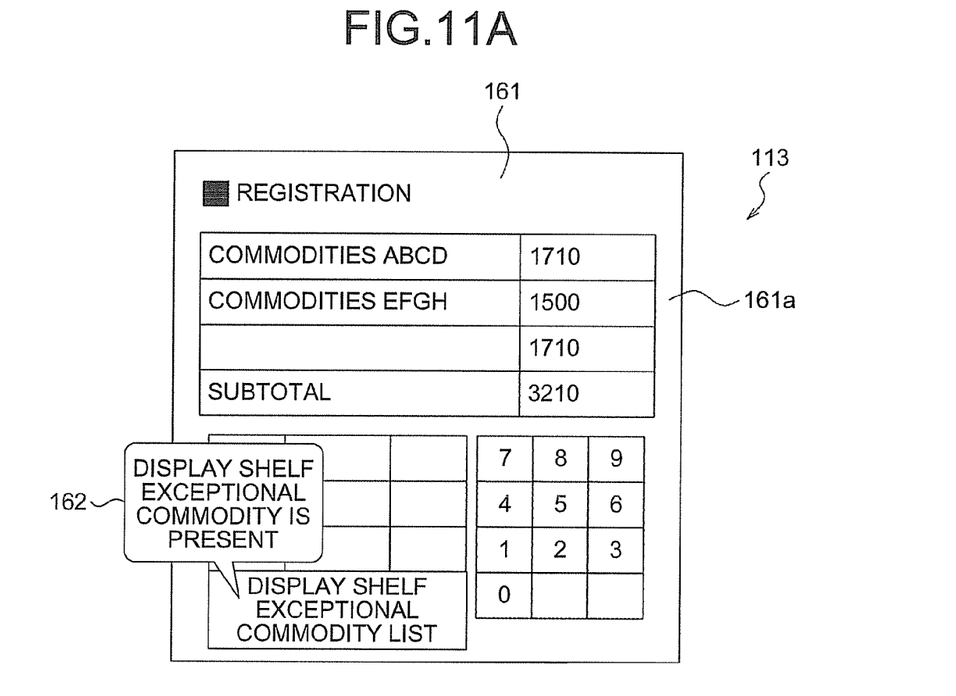
FIGS. 11A and 11B are schematic diagrams of display contents displayed on a display screen of a display of the POS terminal.
Figure 11B:
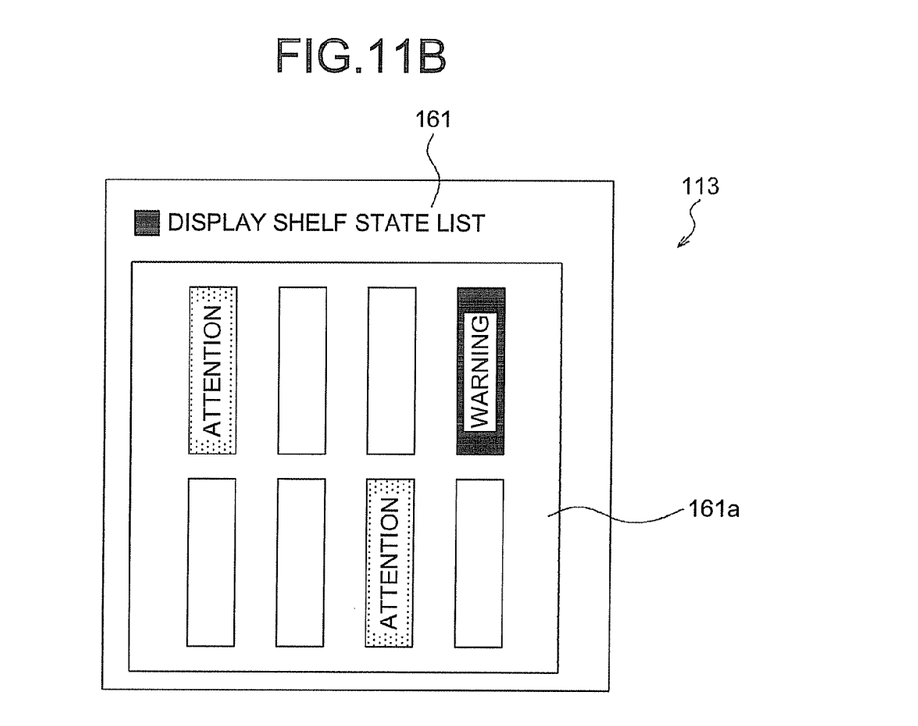

FIG. 9 is a block diagram of the electric configuration of the POS terminal 113. The POS terminal 113 includes a display 113*a* as a display unit, a keyboard 113*b*, a barcode reader 113*c*, a receipt printer 113*d*, a hard disk 113*e* having stored therein various programs and data, and a microcomputer 113*f* as a terminal control unit. The display 113*a* includes a display screen 161 (see FIG. 11). A touch panel 113*g* is laminated and arranged on the display 113*a*. Coordinate information indicating a coordinate touch-designated on the touch panel 113*g* is input to the microcomputer 113*f*. The microcomputer 113*f* controls the display 113*a*, the keyboard 113*b*, the barcode reader 113*c*, the receipt printer 113*d*, and the hard disk 113*e*. A communication interface 113*h* as a signal receiving unit configured to receive a signal is connected to the microcomputer 113*f*. The microcomputer 113*f* executes the programs stored in the hard disk 113*e*. As an example, the microcomputer 113*f* executes a communication program for realizing data communication between the server 117 and the POS terminal 113 via the communication interface 113*h*.

Figure 10A:
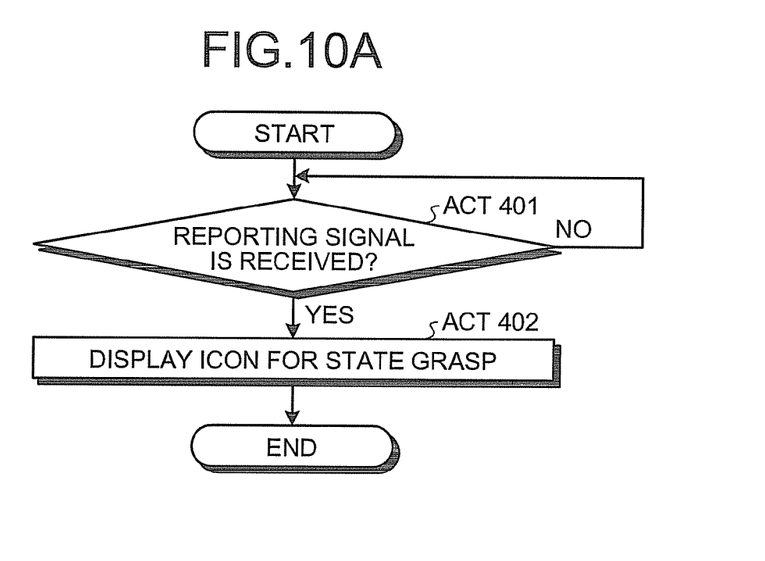
FIGS. 10A and 10B are flowcharts for explaining a flow of processing executed by the POS terminal.
Figure 10B:
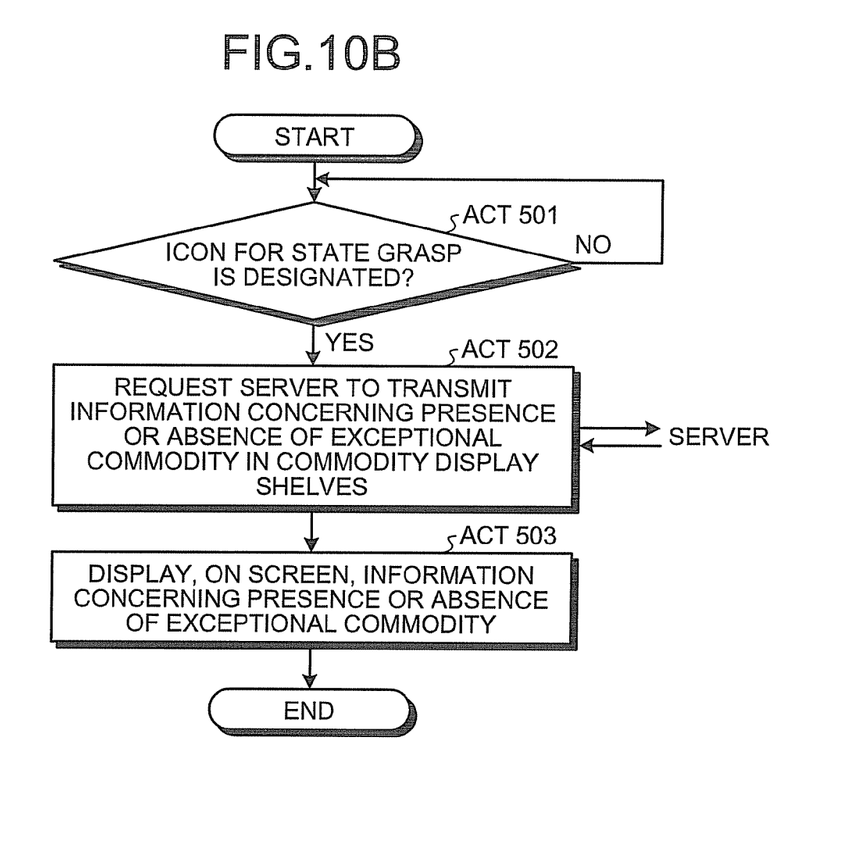

FIGS. 10A and 10B are flowcharts for explaining a flow of processing executed by the POS terminal 113. The microcomputer 113*f* stays on standby until a reporting signal transmitted from the server 117 is received (Act 401). If the microcomputer 113*f* determines that the reporting signal is received (Y in Act 401), the microcomputer 113*f* popup-displays an icon for state grasp 162 (see FIG. 11A) on the display screen 161 of the display 113*a*. The icon for state grasp 162 is formed in, for example, a balloon shape. In this embodiment, the reporting signal is input from the server 117 to the POS terminal 113 via the LAN 116 rather than being transmitted from the radio access point 119 as a radio signal. In other words, in this embodiment, the server 117 is a signal output unit.

The microcomputer 113*f* stays on standby until the icon for state grasp 162 is touch-designated from the touch panel 113*g* in a state in which the icon for state grasp 162 is displayed on the display screen 161 (Act 501). If the microcomputer 113*f* determines that the icon for state grasp 162 is touch-designated (Y in Act 501), the microcomputer 113*f* outputs, to the server 117, a transmission request for causing the server 117 to transmit information concerning presence or absence of an exceptional commodity in the commodity display shelves 109 (Act 502). The microcomputer 113*f* displays, on the display screen 161, the information concerning presence or absence of an exceptional commodity received from the server 117 (Act 503 in FIG. 11B).

FIGS. 11A and 11B are schematic diagrams of display contents displayed on the display screen 161 of the display 113*a* of the POS terminal 113. Usually, the display 113*a* displays a commodity registration screen 161*a* shown in FIG. 11A on the display screen 161. The commodity registration screen 161*a* is used for checkout concerning the commodities 103 performed between the store clerk 106 and the customer 104. The icon for state grasp 162 is displayed in a lower left area of the display screen 161 according to the processing in Act 402 explained above. The icon for state grasp 162 includes a message "a display shelf exception commodity is present". The store clerk 106 can recognize, looking at the icon for state grasp 162, that an exceptional commodity is displayed on any one of the commodity display shelves 109 in the supermarket 102.

When the store clerk 106 touch-designates the icon for state grasp 162 via the touch panel 113*g*, the commodity registration screen 161*a* is switched to a display shelf state list screen 163 according to the processing in Act 503 explained above (FIG. 11B). In the display shelf state list screen 163, the arrangement of the commodity display shelves 109 in the selling floor space 105 is schematically represented. In the display shelf state list screen 163, the commodity display shelf 109, on which an exceptional commodity is displayed, corresponding to a reporting signal with the notification rank "level 1" is indicated by laminating characters "attention" on the background. In the display shelf state list screen 163, the commodity display shelf 109, on which an exceptional commodity is displayed, corresponding to the notification rank "level 2" is indicated by laminating white characters "warning" on a black background. The store clerk 106 operating the POS terminal 113 can recognize, looking at the display shelf state list screen 163, from which commodity display shelf 109 in the supermarket 102 the exceptional commodity has to be immediately removed.

As another embodiment, the icon for state grasp 162 and the display shelf state list screen 163 displayed on the display screen 161 of the display 113*a* of the POS terminal 113 may be displayed on the guide terminal 115 set on the service counter 114.

According to the embodiments explained above, it is unnecessary to attach RFID readers to respective shopping baskets. When a commodity that should not be displayed on a commodity display shelf is displayed on the commodity display shelf, the reporting terminal performs the reporting operation. Therefore, the store clerk has to perform organizing work for commodities displayed on the commodity display shelf only when the reporting terminal performs the reporting operation. Therefore, it is possible to easily realize efficiency of the organizing work for commodities by the store clerk.

Further effects and modifications can be easily derived by those skilled in the art. Therefore, a wider aspect of the present invention is not limited by the specific details and the representative embodiment represented and described above. Therefore, various modifications are possible without departing from the spirit or the scope of the general concept of the invention defined by the appended claims and their equivalents.

What is claimed is:

1. A commodity display position alert system comprising:
commodity display shelves;
an RFID reader provided in each of the commodity display shelves and configured to read a commodity attribute of a commodity from an RFID tag that is attached to the commodity displayed on the commodity display shelf and stores the commodity attribute of the commodity;
a signal output unit configured to output a signal to a reporting terminal; and
a system control unit configured to refer to a shelf-rule storing unit, the shelf-rule storing unit including a first storing unit storing a relationship between the commodity attribute of each of commodities and a category to which a corresponding one of the commodities belongs, a second storing unit storing, for each of shelf codes respectively specifying the commodity display shelves, data indicating whether the commodities included in only one of the categories or the commodities included in two or more of the categories should be displayed in a corresponding one of the commodity display shelves, and a third storing unit storing, for each of the shelf codes, one or two more of the categories of which commodities can be displayed in a corresponding one of commodity display shelves, the system control unit being configured to, in association with the shelf code, store display permission information for defining a commodity that should be displayed on the commodity display shelf, compare the commodity attribute read by the RFID reader and the display permission information corresponding to the shelf code of the commodity display shelf to which the RFID reader is attached, and, when it is determined that a commodity other than the commodity that should be displayed on the commodity display shelf is displayed on the commodity display shelf, cause the signal output unit to output a reporting signal for causing the reporting terminal to perform reporting operation.

2. The system according to claim 1, wherein the display permission information is a category code for specifying the category.

3. The system according to claim 2, wherein the shelf-rule storing unit stores a singularity or a plurality of the category codes in association with the shelf code.

4. The system according to claim 1, wherein
the commodity attribute is a commodity code for specifying each of commodities, and
the display permission information is a singularity or a plurality of the commodity codes.

5. The system according to claim 1, wherein the reporting terminal includes:
a display unit configured to display information;
a signal receiving unit configured to receive a signal; and
a terminal control unit configured to display, according to the reporting signal received by the signal receiving unit, on the display unit, information indicating a commodity display shelf on which a commodity other than a commodity that should be displayed on the commodity display shelf is displayed.

6. A commodity display position alert method comprising:
an RFID reader provided in each of commodity display shelves reading a commodity attribute of a commodity from an RFID tag that is attached to the commodity displayed on the commodity display shelf and stores the commodity attribute of the commodity; and
a system control unit referring to a shelf-rule storing unit, the shelf-rule storing unit including a first storing unit storing a relationship between the commodity attribute of each of commodities and a category to which a corresponding one of the commodities belongs, a second storing unit storing, for each of shelf codes respectively specifying the commodity display shelves, data indicating whether the commodities included in only one of the categories or the commodities included in two or more of the categories should be displayed in a corresponding one of the commodity display shelves, and a third storing unit storing, for each of the shelf codes, one or two more of the categories of which commodities can be displayed in a corresponding one of commodity display shelves, the system control unit being configured to, in association with the shelf code, store display permission information for defining a commodity that should be displayed on the commodity display shelf, comparing the commodity attribute read by the RFID reader and the display permission information corresponding to the shelf code of the commodity display shelf to which the RFID reader is attached, and, when it is determined that a commodity other than the commodity that should be displayed on the commodity display shelf is displayed on the commodity display shelf, causing a signal output unit to output a reporting signal for causing a reporting terminal to perform reporting operation.

7. The method according to claim 6, wherein the display permission information is a category code for specifying the category.

8. The method according to claim 7, wherein the shelf-rule storing unit stores a singularity or a plurality of the category codes in association with the shelf code.

9. The method according to claim 6, wherein
the commodity attribute is a commodity code for specifying each of commodities, and
the display permission information is a singularity or a plurality of the commodity codes.

10. The method according to claim 6, wherein the reporting terminal includes:
a display unit configured to display information;
a signal receiving unit configured to receive a signal; and
a terminal control unit configured to display, according to the reporting signal received by the signal receiving unit, on the display unit, information indicating a commodity display shelf on which a commodity other than a commodity that should be displayed on the commodity display shelf is displayed.

* * * * *